Jan. 28, 1964   F. W. BELLER   3,119,387
GRILL-CARRIED DOOR
Filed July 9, 1962
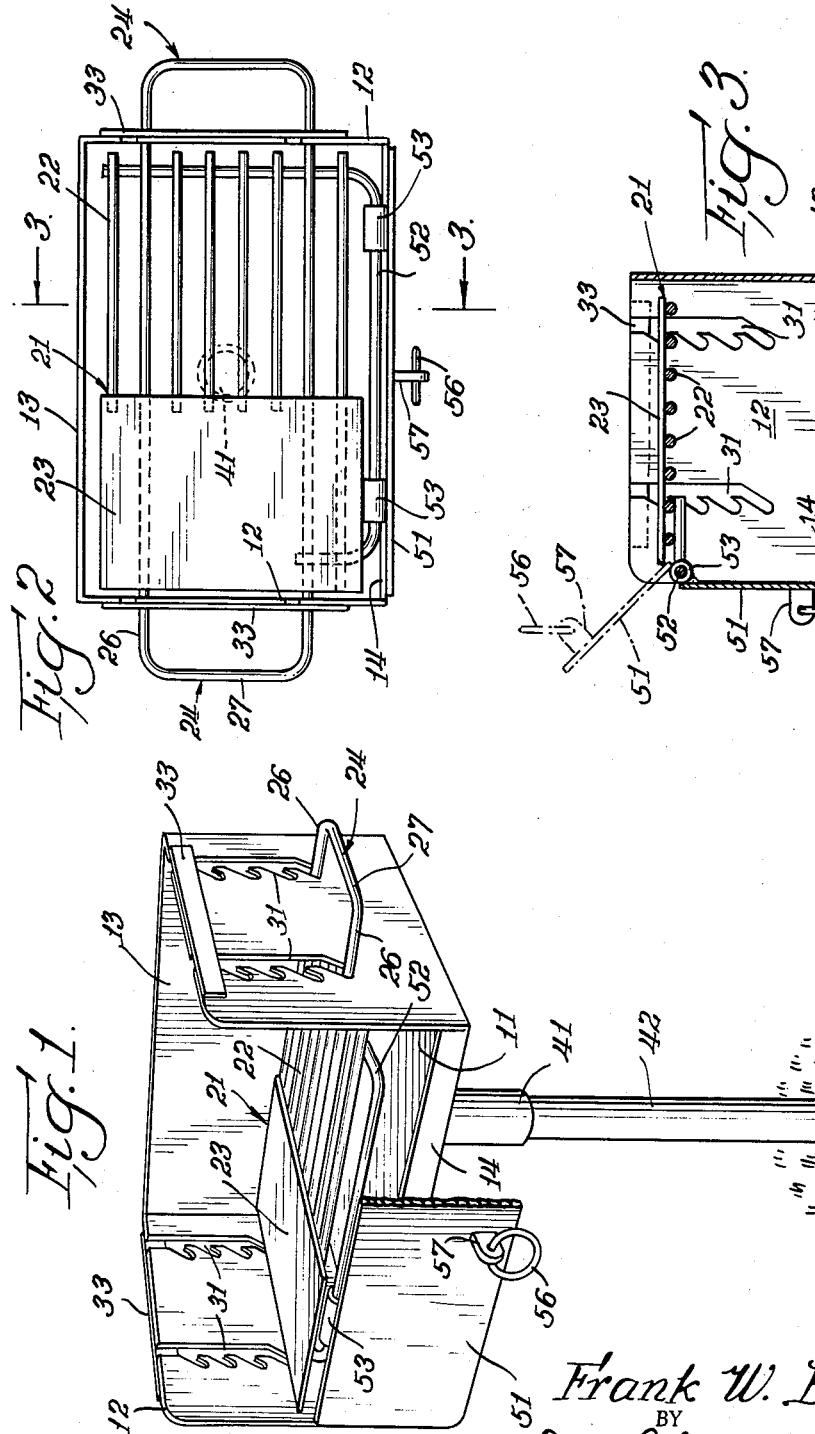
INVENTOR.
*Frank W. Beller*
BY
*Darbo, Robertson & Vandenburgh*
*Att'ys.*

United States Patent Office 3,119,387
Patented Jan. 28, 1964

3,119,387
GRILL-CARRIED DOOR
Frank W. Beller, Aurora, Ill., assignor to Belson
Manufacturing Company, a partnership
Filed July 9, 1962, Ser. No. 208,421
2 Claims. (Cl. 126—25)

In charcoal fired grills for outdoor cooking, it is desirable to have the height of the grill above the charcoals adjustable. It is also desirable to have the fire or glowing charcoals enclosed or shielded on all sides. This is particularly true in public parks and recreation areas where the stove may be left unattended after use. If a wind comes up, it could fan the coals and start a blaze, and if any burnable trash has been inserted under the grill of the stove by neat picnickers, it may be set afire and blown off conceivably starting a brush fire or forest fire.

The enclosing of the coals when the grill is adjustable in height presents a problem. Cooks do not like obstructions extending above the grill between themselves and the grill. Also, if the grill is made nonremovable for protection against vandalism, there must be no removable parts, and yet access to the firebox from one side is necessary.

The present invention solves the various problems by providing a door permanently hinged at its top to the structure of the adjustable grill and extending low enough to shield and enclose the coals even in the grill's highest position. When the grill is lowered, the door is lowered with it and hangs harmlessly below the bottom of the firebox. In all positions the door rests on the bottom pan (or side flange 14) so it cannot swing in too far. It is also prevented from being swung open so far it will not swing closed by gravity.

Additional objects and advantages will be apparent from the following description and from the drawings.

Designation of Figures

FIGURE 1 is a perspective view of a form of the invention chosen for illustration.

FIGURE 2 is a top view of the form of the invention shown in FIG. 1.

FIGURE 3 is a vertical sectional view taken approximately along the line 3—3 of FIG. 2.

Background Description

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

In its preferred form, the outdoor stove of this invention is made of generally rectangular form from heavy sheet metal or plate. It includes a bottom panel 11, end panels 12, and rear panel 13. The end and rear panels 12 and 13 are rigid with one another and with the bottom panel 11. For example, end wall 12 may be molded from the same strip as rear wall 13 and the three welded to bottom panel 11. Bottom panel 11 preferably has a forward flange 14 which holds the charcoals or other fire on the panel or fire holder 11 without making it too difficult to clean out the ashes.

A cooking rack or grill 21 occupies substantially the entire cross section. In the illustrated form it includes a rib section 22 and a hot plate section 23.

Handles 24 extend through end wall 12. These handles are of U-shape including legs 26 and base 27. The base 27 is spaced outwardly from the end walls 12 to be easily grasped by the hand. The legs 26 may conveniently be extensions from two of the parallel grid bars of grid 22.

The handles 24 extend through slots 31 in the two end walls. As clearly seen in FIG. 1, these slots are generally vertically disposed but are notched to hold the cooking rack 21 at different levels. Preferably the notches slant as shown, to substantially eliminate the danger of accidental displacement. Nevertheless the elevation of the rack is very easily adjusted by merely grasping both of the handles 24 and raising the rack or lowering the rack to a different notch.

During manufacture, the notches 31 are simply open at their top. In other words, they extend all the way to the top of the end wall 12. The various legs 26 are simply fitted into them as the rack 21 is lowered into place. Thereafter, retaining bars 33 are welded to the end walls 12 and positively prevent the removal of cooking rack 21. This welding may be spot welding, and preferably includes welding points close to each side of both of the slots 31. This sufficiently reinforces the slotted end walls 12. Of course, other means of making the grill nonremovable could be used. Although non-removability is not necessary for home use, it is important for public places, such as parks and picnic grounds.

Although the outdoor stove or brazier of this invention may be supported in any way, a tamper resistant swivel is preferred, such as that in my prior application Serial No. 7,714, filed February 9, 1960, now Patent No. 3,053,245.

According to the present invention, a door 51 is hinged permanently to a front bar 52 of the structure of grill 21, normally hanging nearly straight downwardly from it. The front bar 52 could be a bar forming the grill surface, if hot plate 23 is not in the way. The permanent securing may be by hinge members 53 surrounding the wire or rod 52 and welded to the door 51. Hinge members 53 are shown as tubes, but straps could be used. Thus, the door is permanently hinged to the grill, which in turn is irremovable, though adjustable.

As grill 21 is adjusted, door 51 is raised or lowered with the grill. At all heights, it adequately closes in or shields the main fire or coals, and the entire space below the grill. Yet when the grill is raised, and the door swung up, ashes or residue may easily be removed and new charcoal inserted. The hot plate 23 (or other stop means, if the hot plate is not used) prevents the door from being raised so far it will not fall back by gravity to the closed position.

A handle 56 may be provided, preferably a simple hinged ring as shown, preferably spaced from door 51 by post 57.

The resulting stove, although neat in appearance, economical to manufacture, and adequately adjustable, is exceptionally safe. A door is provided to enclose the firebox on its fourth side, yet it need never be in the way. There is no loose part readily removed. The grill or cooking rack cannot be removed without severing the metal, even though it is fully adjustable with great ease. The door 51 moves automatically with the grill and can be swung up for access, and yet cannot be removed.

I claim:

1. A vandal resistant brazier including a pan-shaped portion forming a fire space for holding burning coals, walls extending upwardly from the side and rear walls of the pan-shaped portion, and forming three sides of a four sided enclosure, a cooking rack positioned within the enclosure and adjustable as to height therein, and a door forming the fourth side of said enclosure and permanently hinged to the cooking rack to hang therefrom and shield the fire space except when swung open for access thereto, said brazier including stop means effective in all positions of the rack for limiting the closing movement of the door so it cannot swing inwardly to expose the fire space.

2. A vandal resistant brazier including a pan-shaped portion forming a fire space for holding burning coals, walls extending upwardly from the side and rear walls of the pan-shaped portion, and forming three sides of a four sided enclosure, a cooking rack positioned within the enclosure and adjustable as to height therein, and a door forming the fourth side of said enclosure and permanently hingtd to the cooking rack to hang therefrom and shield the fire space except when swung open for access thereto, said brazier including stop means effective in all positions of the rack for limiting the closing movement of the door so it cannot swing inwardly to expose the fire space and stop means for preventing the door from swinging open too far to close itself by gravity.

References Cited in the file of this patent
UNITED STATES PATENTS

| | | |
|---|---|---|
| 2,608,180 | Winning et al. | Aug. 26, 1952 |
| 2,789,996 | Rumsey | Apr. 9, 1957 |
| 3,060,918 | Meyer | Oct. 30 1962 |
| 3,070,084 | Gier | Dec. 25, 1962 |